(12) United States Patent
Andrejasic et al.

(10) Patent No.: US 12,325,540 B1
(45) Date of Patent: Jun. 10, 2025

(54) AIRCRAFT WITH MULTIFUNCTIONAL STRUCTURE

(71) Applicant: Pipistrel d.o.o., Ajdovscina (SI)

(72) Inventors: Matej Andrejasic, Postojna (SI); David Erzen, Ljubljana (SI); Rok Lapuh, Ljubljana (SI); Blaz Mocan, Ljubljana (SI); Andres Znidar, Vrhnika (SI); Tine Tomazic, Vrhnika (SI); Jernej Drofelnik, Ljubljana (SI); Gregor Cretnik, Ljubljana (SI)

(73) Assignee: PIPISTREL D.O.O., Ajdovscina (SI)

( * ) Notice: Subject to any disclaimer, the term of this patent is extended or adjusted under 35 U.S.C. 154(b) by 22 days.

(21) Appl. No.: 18/531,000

(22) Filed: Dec. 6, 2023

(51) Int. Cl.
| | |
|---|---|
| *B64U 10/20* | (2023.01) |
| *B64C 25/58* | (2006.01) |
| *B64U 30/20* | (2023.01) |
| *B64U 101/60* | (2023.01) |

(52) U.S. Cl.
CPC ............. *B64U 10/20* (2023.01); *B64C 25/58* (2013.01); *B64U 30/20* (2023.01); *B64U 2101/60* (2023.01)

(58) Field of Classification Search
CPC ..... B64C 29/00; B64C 29/0025; B64C 39/04; B64C 39/12; B64U 10/20; B64U 30/20
See application file for complete search history.

(56) References Cited

U.S. PATENT DOCUMENTS

| | | |
|---|---|---|
| 2020/0277045 A1 | 9/2020 | Parks |
| 2021/0291968 A1 | 9/2021 | Tischhauser |
| 2022/0212788 A1 | 7/2022 | Fen |
| 2022/0380047 A1 | 12/2022 | Tian |
| 2023/0242283 A1 | 8/2023 | Tian |

*Primary Examiner* — Timothy D Collins
*Assistant Examiner* — Justin Michael Heston
(74) *Attorney, Agent, or Firm* — SLATER MATSIL, LLP

(57) ABSTRACT

An embodiment aircraft boom includes a boom member, a vertical stabilizer, a rear landing gear, and a front landing gear. The boom member may extend in a first direction and have a front internal structural member disposed therein, where a portion of the front internal structural member is a first attachment point for a first wing. The vertical stabilizer may extend from the boom member, where the vertical stabilizer has a rear internal structural member disposed therein and extends from the boom member and through an interior of the vertical stabilizer, and where a portion of the rear internal structural member is a second attachment point for a second wing. The rear landing gear may be coupled to the rear internal structural member. The front landing gear may be coupled to the front internal structural member of the boom member.

17 Claims, 9 Drawing Sheets

AIRCRAFT WITH MULTIFUNCTIONAL STRUCTURE

TECHNICAL FIELD

The present disclosure relates generally to aircraft, and in particular to a multifunctional structure for supporting an aircraft fuselage.

BACKGROUND

Generally, cargo aircraft (also known as cargo planes or freighter aircraft) are designed or configured to be used for transporting goods and cargo by air. Cargo aircraft provide the ability to ship and transport goods and cargo great distances quickly and energy efficiently, to many locations on the earth. There are a wide variety of cargo aircrafts, such as airplanes, helicopters, quadcopters, and the like, of varying size, cargo capacity, and travel range.

Currently, most cargo aircrafts are airplanes with jet engines. Although such aircraft are typically capable of carrying relatively large loads, a disadvantage of such aircrafts is that they need a long paved, or at least relatively smooth, runway or path for takeoff and landing. Additionally, helicopters may be used for cargo transport by air, which have an advantage of vertical takeoff and landing, but typically lack the speed and travel range of a fixed-wing airplane.

Most currently-used cargo aircraft are only powered by engines that use hydrocarbon-based fuel, such as jet engines and internal combustion engines, for propulsion. Also, most currently-used cargo aircraft are manned aircraft typically requiring two human pilots. Disadvantages of human pilots for cargo aircraft are the limited amount of working hours per day, as well as the human labor cost. Hence, there is a need for unmanned cargo aircraft that are fuel efficient, incorporating electric motors, or hybrid combinations thereof for achieving propulsion or lift.

SUMMARY

An embodiment aircraft boom includes a boom member, a vertical stabilizer, a rear landing gear, and a front landing gear. In the embodiment, the boom member extends in a first direction and has a front internal structural member disposed therein, where a portion of the front internal structural member is a first attachment point for a first wing. In the embodiment, the vertical stabilizer extends from the boom member, where the vertical stabilizer has a rear internal structural member disposed therein and extends from the boom member and through an interior of the vertical stabilizer, and where a portion of the rear internal structural member is a second attachment point for a second wing. In the embodiment, the rear landing gear is coupled to the rear internal structural member, where the rear landing gear extends through a bottom rear portion of the boom member. And in the embodiment, the front landing gear is coupled to the front internal structural member of the boom member, where the front landing gear extends through a bottom front portion of the boom member.

An embodiment aircraft includes a fuselage, a first wing coupled to the fuselage, a second wing coupled to the fuselage, a boom member located outside of the fuselage and separated from the fuselage by a first spaced distance, a vertical stabilizer extending between the boom member and the second wing, where the boom member is coupled to the second wing via the vertical stabilizer, a rear landing gear coupled to a rear internal structural member of the vertical stabilizer, where the rear internal structural member is coupled to the second wing, and a front landing gear coupled to a front internal structural member of the boom member, where the front internal structural member is coupled to the first wing.

An embodiment method of producing an aircraft includes attaching a boom member to a first wing via a front internal structural member of the boom member, attaching a front landing gear to the front internal structural member, attaching a vertical stabilizer to a second wing via a rear internal structural member of the vertical stabilizer, where the boom member is coupled to the second wing via the rear internal structural member, attaching a rear landing gear to the rear internal structural member, attaching the first wing to a fuselage, where the boom member is separated from the fuselage by a first spaced distance, and attaching the second wing to the fuselage, where the vertical stabilizer is separated from the fuselage by a second spaced distance.

BRIEF DESCRIPTION OF THE DRAWINGS

The above and other features and advantages of the present disclosure can be more apparent based on the following detailed description taken in conjunction with the accompanying drawings, in which.

DETAILED DESCRIPTION OF ILLUSTRATIVE EMBODIMENTS

Figure 1:
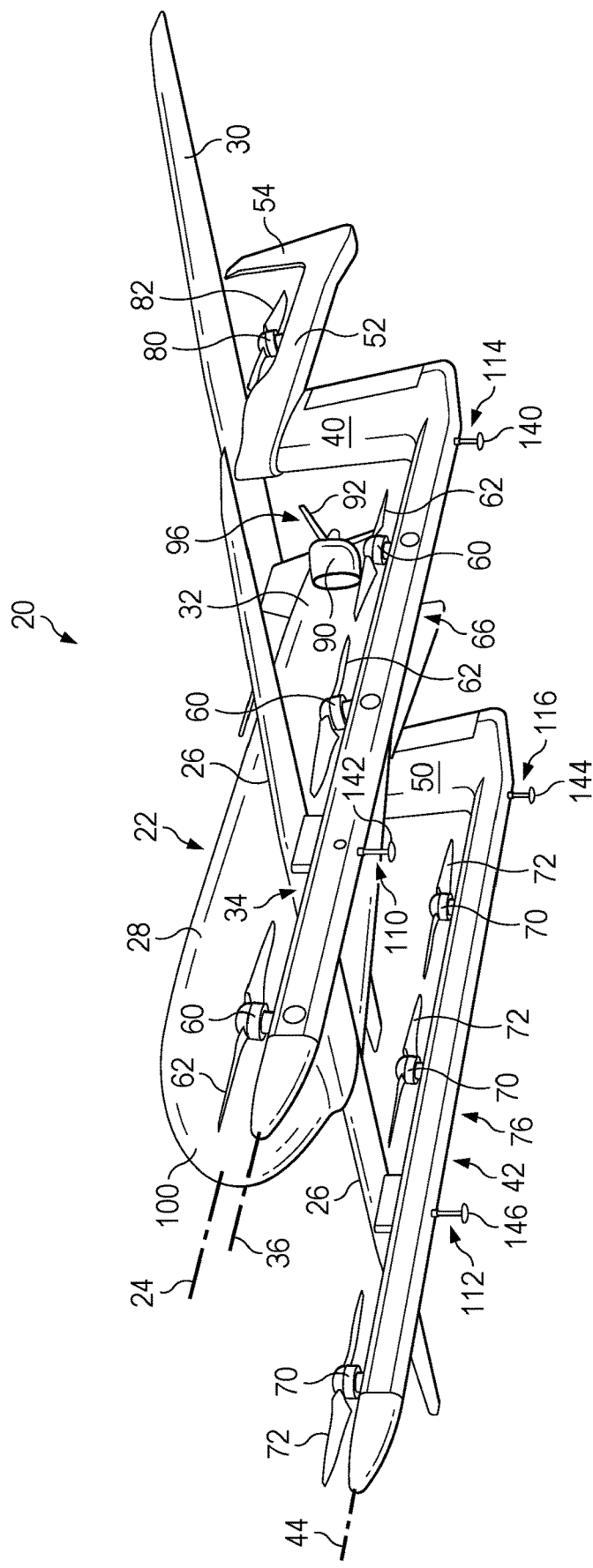
FIG. 1 is a bottom perspective view of an aircraft according to some embodiments.

Referring now to the drawings, wherein like reference numbers are used herein to designate like or similar elements throughout the various views, illustrative embodiments are shown and described. The figures are not necessarily drawn to scale, and in some instances the drawings can be exaggerated or simplified in places for illustrative purposes only. One of ordinary skill in the art can appreciate many possible applications and variations for other embodiments based on the following illustrative embodiments provided in the present disclosure.

In an embodiment, many structures, components, and configurations on a right side of an aircraft may be identical, or mirror symmetrical, to those on a left side of the aircraft, and vice versa. Thus, to reduce redundant descriptions while describing the drawings, a description in the present disclosure might be only provided and shown in more detail for structures, components, and configurations of only one side of an aircraft embodiment, and it can be apparent to one of ordinary skill in the pertinent art that such structures, components, and configurations of another or opposite side are or may be identical or mirror symmetrical. For example, for the embodiments illustrated in FIGS. 1-8, all or most all of the components labeled with an adjective "left" can have a mirrored or symmetric "right" twin, and vice versa.

Figure 2:
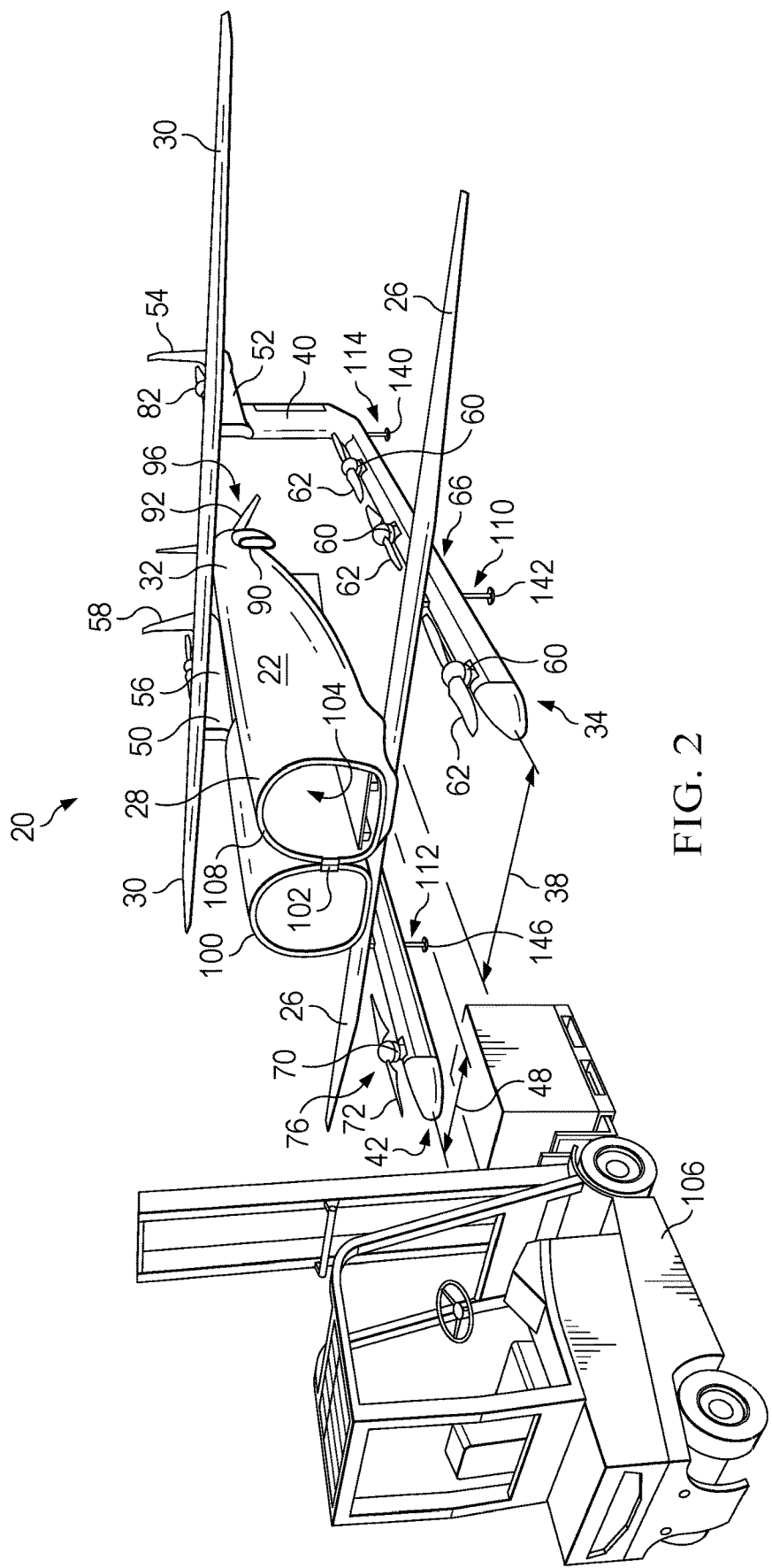
FIG. 2 is a top perspective view of an unmanned cargo aircraft according to some embodiments.

FIG. 1 is a bottom perspective view of an aircraft 20, and FIG. 2 is a top perspective view of the aircraft 20. In some embodiments, an aircraft 20 may have a fuselage 22 extending along a central longitudinal axis 24 of the aircraft 20. In some embodiments, the aircraft 20 has one or more booms 66, 76 attached to the fuselage 22 by one or more wings 26, 30. The booms 66, 76 may include a boom disposed on each side of the fuselage 22. Each boom 66, 76 may include elements that permit attachment to wings and support for one or more drive systems. For example, a left boom 66 may have a left boom member 34 and left secondary boom member 52 connected by a left vertical stabilizer 40. Additionally, the left boom 66 may have a left secondary vertical stabilizer 54 connected to the left secondary boom member 52. A right boom 76 may have similar elements, with a right boom member 42 and right secondary boom member 56 that are connected by a right vertical stabilizer 50. A right secondary vertical stabilizer 58 may also be attached to the right secondary boom member 56. The aircraft 20 may have a front wing 26 mechanically coupled to a front portion 28 of the fuselage 22, and in some embodiments, the front wing 26 may be a low wing configuration and may be disposed as a lower portion of the fuselage 22. The aircraft 20 may have a rear wing 30 mechanically coupled to a rearward portion 32 of the fuselage 22, and located above, or attached to an upper part of, the fuselage 22.

In some embodiments, an aircraft 20 may have a left boom member 34 extending along a left-side longitudinal axis 36 of the aircraft 20, on the left side relative to the fuselage 22. The left boom member 34 may be mechanically coupled to, and supported by, the front wing 26 at a first spaced distance 38 from the fuselage 22 via, for example, a left front internal structural member (not shown, see FIGS. 3, 6, and 7). A left vertical stabilizer 40 may extend between the left boom member 34 and the rear wing 30. In some embodiments, the left boom member 34 may be mechanically coupled to, and supported by, the rear wing 30 via the left vertical stabilizer 40 via, for example, a left rear internal structural member (not shown, see FIGS. 3-5).

In some embodiments, an aircraft 20 may have a right boom member 42 that is mirror symmetrical to the left boom member 34. The right boom member 42 may extend along a right-side longitudinal axis 44 of the aircraft 20, on the right side relative to the fuselage 22. As will be detailed more below, the right boom member 42 may be mechanically coupled to and supported by the front wing 26 at a second spaced distance 48 from the fuselage 22, for example, via a right front internal structural member not shown in FIGS. 1 and 2. A right vertical stabilizer 50 may extend between the right boom member 42 and the rear wing 30. As will be detailed more below, the right boom member 42 may be mechanically coupled to and supported by the rear wing 30 via the right vertical stabilizer 50, for example, via a right rear internal structural member not shown in FIGS. 1 and 2.

In some embodiments, the aircraft 20 may have a left secondary boom member 52 extending rearward from the left vertical stabilizer 40. The left secondary boom member 52 may have a left secondary vertical stabilizer 54 extending therefrom. In some embodiments, an aircraft 20 may have a right secondary boom member 56 extending rearward from the right vertical stabilizer 50. The right secondary boom member 56 may have a right secondary vertical stabilizer 58 extending therefrom. In some embodiments, the shape and size of the secondary vertical stabilizers 54, 58 may vary from the disclosed examples.

In some embodiments including a composite material skin, such as carbon fiber or fiberglass, part or all of an outer composite skin of the left boom member 34, part or all of an outer composite skin of the left vertical stabilizer 40, and part or all of an outer composite skin of the left secondary boom member 56, may be a single integral part, as opposed to multiple parts attached together by bolts or rivets, for example. In some embodiments, multiple composite skin pieces or portions may be bonded together during manufacturing to form a single integral composite skin, as opposed to being bolted or riveted together. Multiple layers of a composite material, may be layered, overlapped, joined, adjacent, bonded, or any combination thereof, in a single mold or multiple molds to form a single integral composite material skin for forming one of or any combination of components, sections, portions, or parts of an aircraft structure in accordance with an embodiment of the present disclosure. Similarly, multiple different composite materials, such as carbon fiber, fiberglass, titanium fibers, and aramid, in woven and/or mesh forms, may be layered, overlapped, joined, adjacent, bonded, or any combination thereof, in a single mold or multiple molds to form a single integral composite material skin for forming one of or any combination of components, sections, portions, or parts of an aircraft structure in accordance with an embodiment of the present disclosure.

In some embodiments, the left boom member 34 may have one or more drive systems that provide lift or thrust. For example, the left boom member 34 may have three electric motors 60 as part of drive systems driving vertical lift propellers 62. Additionally, in some embodiments, the left boom member 34 may house electric batteries 64 (not shown, see FIG. 3), for a vertical propulsion system. The vertical lift propellers 62 may be mechanically coupled to the electric motors 60, such that the electric motors 60 drive the motion of, and provide torque to, the vertical lift propellers 62. Mirror symmetrical of that shown on the left side, in some embodiments, the right boom member 42 also may have three electric motors 70 of drive systems and vertical lift propellers 72. Additionally, the right boom member 42 may house electric batteries, for a vertical propulsion system of the right side.

In some embodiments, the left secondary boom member 52 may have one or more electric motors 80 of a drive system and an associated vertical lift propeller 82. The left secondary boom member 52 may house an electric battery 84 (see FIG. 3). The vertical lift propeller 82 may be mechanically coupled to the electric motor 80, such that the electric motor 80 drives the motion of, and provides torque to, the vertical lift propeller 82. The electric battery 84 may be electrically coupled to the electric motor 80 to provide power to the electric motor 80. The electric motor 80, the vertical lift propeller 82, and the electric battery 84 may be part of the vertical propulsion system of the left side of the aircraft 20.

It should be understood that the term "motor" may be used and considered as a subset of "engines." For example, an engine may be or may include an electric motor, or may be, or include an internal combustion engine, turbine, ducted fan, turbofan, turboprop, or another power or propulsion system.

Mirror symmetrical of that shown on the left side, in some embodiments, the right secondary boom member 56 may have an electric motor and a vertical lift propeller. The right secondary boom member 56 may also house an electric battery. The electric motor, the vertical lift propeller, and the electric battery at the right secondary boom member 56 may be part of the vertical propulsion system of the right side of the aircraft 20.

In some embodiments, a vertical propulsion system of the left or right boom members 34, 42, or the left or right secondary boom members 52, 56, may include an internal combustion engine that is fueled by hydrocarbon fuel, hydrogen, or the like, or an electric motor, a turbine, or hybrid combination thereof, or another power system.

In some embodiments, the electric motors 60, 70 extend above a top surface of the boom member(s) 34, 42, 52, 56. In some embodiments, the mechanical coupling to attach the electric motors 60, 70 to the boom members 34, 42, 52, 56 also extend above a top surface of the boom member(s) 34, 42, 52, 56. In some embodiments, the electric motors 60, 70 may be attached to the boom members 34, 42, 52, 56 using a bracket, flange, movable mechanism for changing a tilt angle of the electric motor, adjustable mechanism for adjusting a tilt angle of the electric motor, or the like, and attached using bolts, rivets, screws, or other fasteners or other fastening techniques such as spot welding, adhesives, or the like, for example. In some embodiments, the electric motors 60, 70 may be located partially or completely inside the boom member(s) 34, 42, 52, 56. In some embodiments, the engine mounting mechanism or bracket may be located partially or completely inside the boom member(s) 34, 42, 52, 56. In some embodiments, the electrical motors 60, 70 and the propellers 62, 72 may be extending below a bottom surface of the boom member(s) 34, 42, 52, 56. Likewise, in some embodiments, the engine mounting mechanism or bracket may be extending below a bottom surface of the boom member(s) 34, 42, 52, 56.

In some embodiments, an aircraft 20 has a forward propulsion engine 90 mechanically coupled to a rearward portion 32 of the fuselage 22. In some embodiments, a forward propulsion propeller 92 may be mechanically coupled to the forward propulsion engine 90. In some embodiments, the forward propulsion engine 90 may be an internal combustion engine that is fueled by hydrocarbon fuel, hydrogen, or the like, or an electric motor, a turbine, or hybrid combination thereof, or another power system. Hence, a forward propulsion system 96 of an aircraft 20 may include a forward propulsion engine 90 and a forward propulsion propeller 92.

In some embodiments, an aircraft 20 may have a nose portion 100 mechanically coupled to a front portion 28 of the fuselage 22, for example, by being moveably attached by a hinge 102, removably attached using bolts, releasable straps, or other fasteners. With the nose portion 100 in an open position, as shown in FIG. 2, the aircraft 20 may be configured for front loading cargo into the fuselage 22, enabling easy access to an interior cargo area 104 of the fuselage 22 using a conventional fork lift vehicle or device 106.

In some embodiments, a front wing 26 may be mechanically coupled to the fuselage 22 behind or aft of the nose opening 108, such that access to the nose opening 108 is clear of obstruction or such that a conventional fork lift vehicle 106, or other loading device, may have unobstructed access to the cargo area 104 of the fuselage 22 via the nose opening 108. These features and configuration options for some embodiments provide an advantage that new or specialized equipment is not necessarily needed for loading cargo into and unloading cargo from the aircraft 20.

The aircraft 20 having vertical takeoff and landing capabilities permits the aircraft 20 to be landed in a relatively small area without necessarily the need for a long runway and navigating or traversing taxiways. Thus, an aircraft 20 may be landed and loaded in a parking lot or loading area of many existing facilities without necessarily the need for more real estate or additional new space. This may save a great deal of time and reduce the complexity of shipping logistics for getting goods and cargo transported from a manufacturing site or a warehouse to a cargo aircraft 20 for flight to another location. For example, rather than loading cargo first on a truck to be transported to an airfield to be then off-loaded from the truck and loaded into a cargo airplane at the airfield, the cargo may be loaded directly into a cargo aircraft 20 of some embodiments at the manufacturing site or warehouse, and skipping the step of using a truck to transport the cargo to the airfield.

Furthermore, because an aircraft 20 of some embodiments may be an unmanned aircraft, the aircraft may be more simplified by having a hinge-coupled nose portion 100 that may swing open, providing a large front opening, such as nose opening 108, permitting access to the interior cargo space 104 of the fuselage 22. Additionally, having a forward propulsion system 96 located on the back portion 32 of the fuselage 22, along with having the vertical propulsion systems located at the left and right boom members 34, 42, 52, 56 at spaced distances 38, 48 from the fuselage 22, further enhances the ease of access to the interior cargo space 104 of the fuselage 22 while front loading and unloading cargo.

In some embodiments, an aircraft 20 may have a forward propulsion engine mechanically coupled to a front portion 28 of the fuselage 22. In such embodiment, the aircraft 20 may be configured for rear loading of the fuselage 22. In such an embodiment, a rear cap portion (not shown) may be moveable, for example, hinge-coupled or removably coupled to the rear end of the fuselage 22. Such rear-loading configuration embodiment may still have advantages noted above for a front-loading configuration embodiment. Placing the forward propulsion engine at the front of the fuselage 22, rather than on the rear of the fuselage 22, would entail multiple design considerations, such as the size of the front wing 26 relative to the rear wing 30, locations of the front and rear wings, and the like, in view of a different weight distribution and different aerodynamic characteristics. Additionally, in some embodiments, the forward propulsion engine 90 or system 96 may be also reversable, for example, using an electric motor, to provide more movement and maneuvering options during takeoff and landing.

In some embodiments, an aircraft 20 may have one or more landing gear assemblies extending from the left boom member 34 and the right boom member 42. For example, an aircraft may have a front left landing gear 110, a front right landing gear 112, a rear left landing gear 114, and a rear right landing gear 116.

Figure 3:
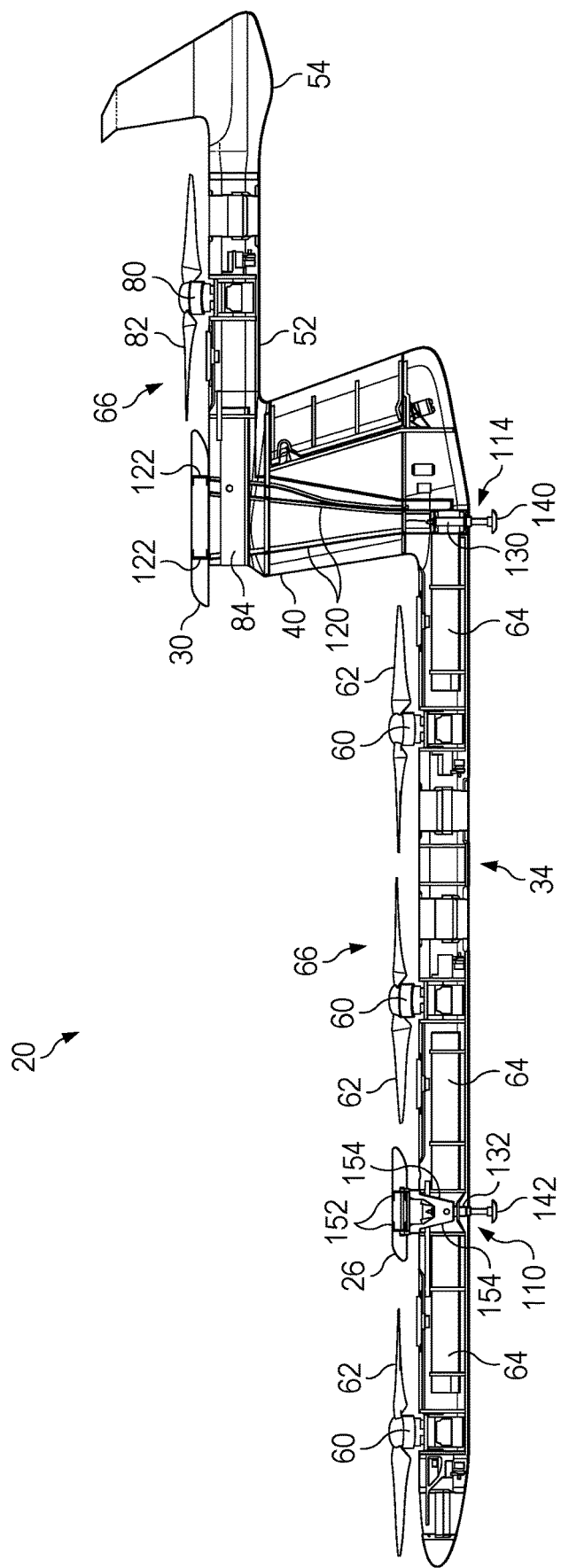
FIG. 3 is a side and cutaway view of a portion of an aircraft according to some embodiments.
Figure 4:
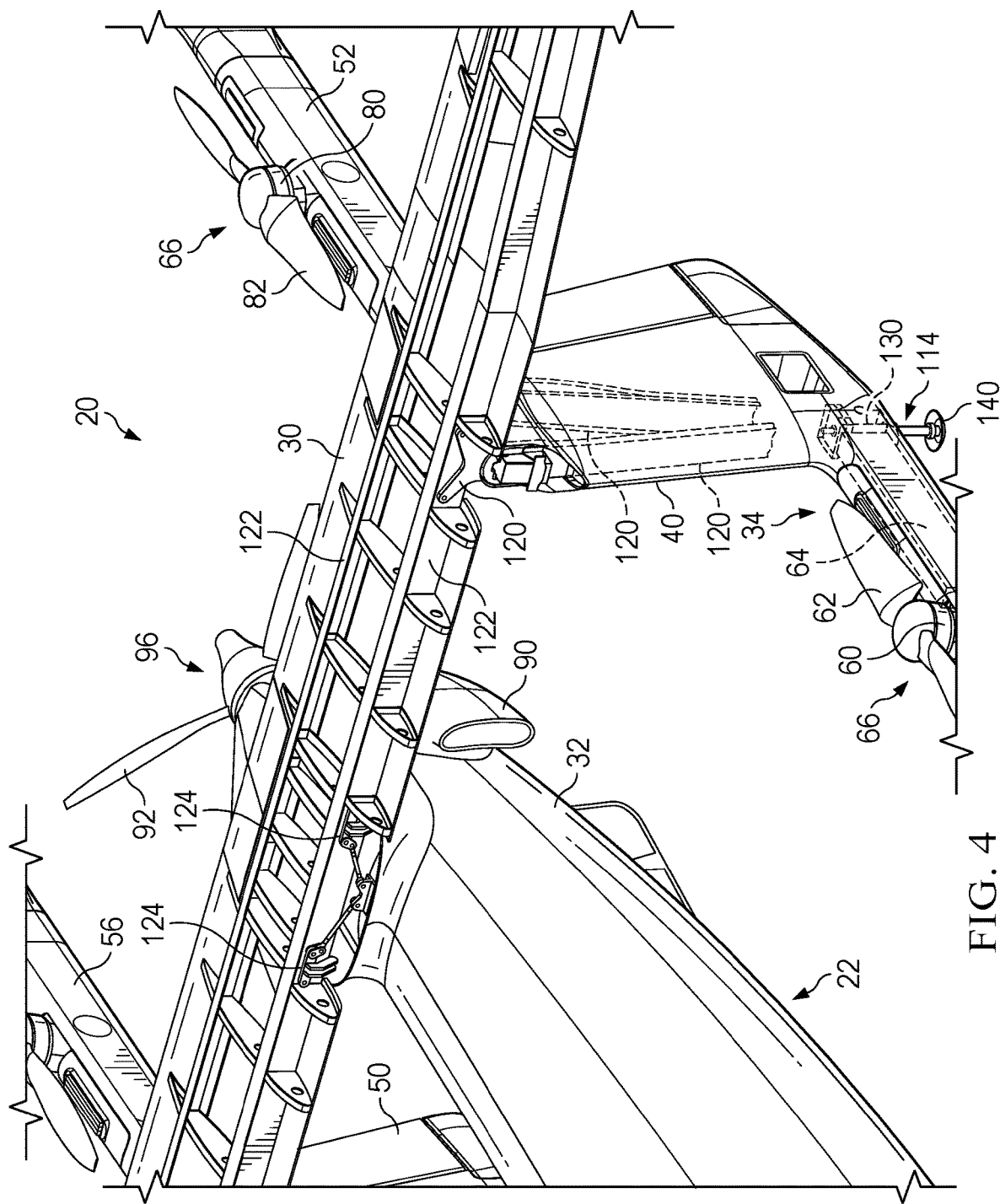
FIG. 4 is a top-front perspective and cutaway view of a portion of an aircraft according to some embodiments.
Figure 5:
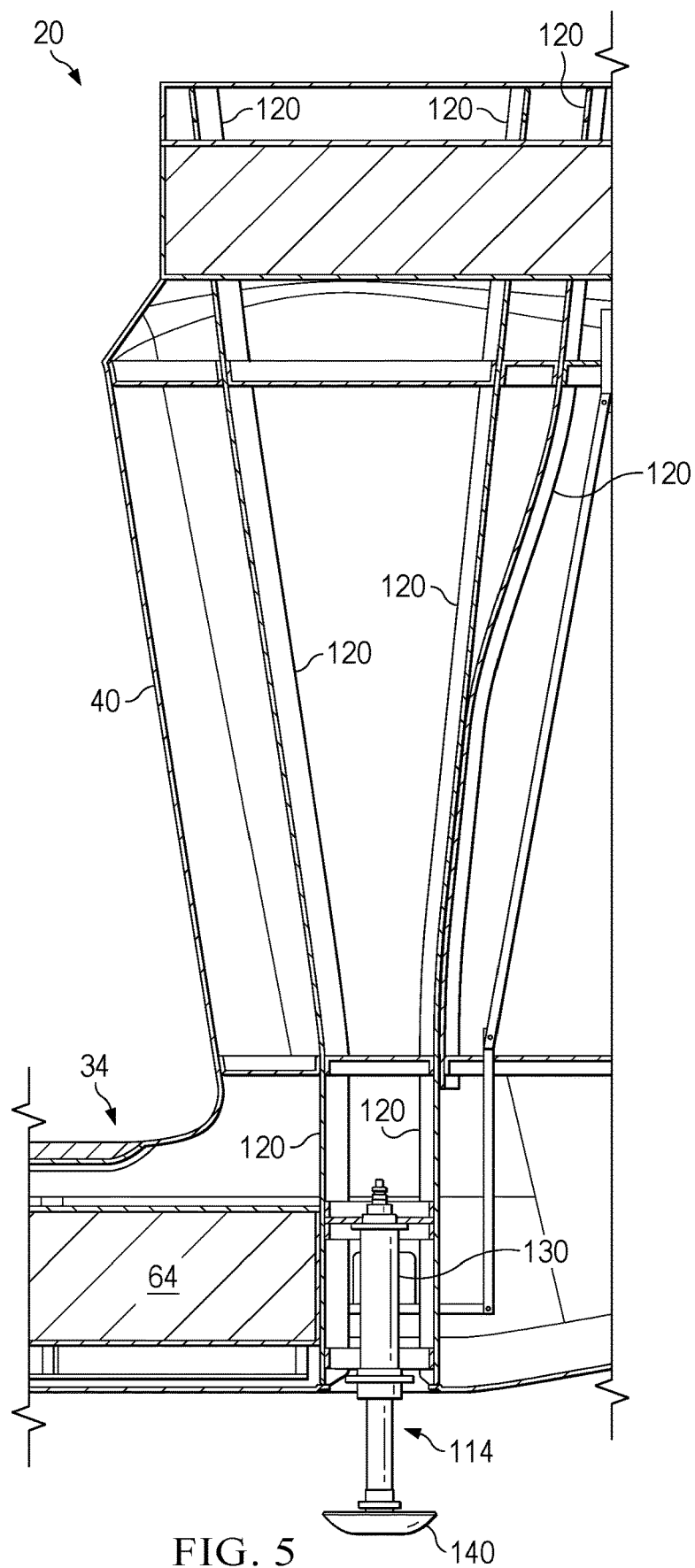
FIG. 5 is a cutaway view of a portion of an aircraft according to some embodiments.

FIG. 3 is a side cutaway view of a portion of an aircraft according to some embodiments. A right portion of the aircraft 20 may be identical or mirror symmetrical. FIG. 4 is a top-front perspective cutaway view of a portion of an aircraft according to some embodiments, and illustrates a left portion of a rear wing 30, a left vertical stabilizer 40, and a left rear landing gear 110, 114. FIG. 5 is a cutaway view of a portion of an aircraft according to some embodiments and illustrates a left vertical stabilizer 40 and a left rear landing gear 114. A corresponding right portion of the aircraft 20 may be identical or mirror symmetrical. FIG. 3 shows a cutaway view of a left boom member 34, a left vertical stabilizer 40, a left secondary boom member 52, and a left secondary vertical stabilizer 54, of an aircraft 20. Components of a left vertical propulsion system are illustrated. In some embodiments, electric motors 60, 80 may be mechanically coupled to the left boom members 34, 52. As shown in FIG. 3, electric batteries 64, 84 may be electrically coupled to the electric motors 60, 80 for providing power to drive the electric motors 60, 80, for example, during vertical takeoff and landing. Propellers 62, 82 configured and oriented for providing vertical lift may be mechanically coupled to the electric motors 60, 80, to be driven by the electric motors 60, 80. Although three electric motor and propeller combinations 60, 62 in the left boom member 34 and one electric motor and propeller combination 80, 82 in the left secondary boom member 52 are shown in FIG. 3, any suitable number of electric motor and propeller combinations may be implemented in some embodiments. And although one battery is shown electrically coupled to each electric motor, the number of batteries used per electric motor may vary in some embodiments. Furthermore, the placements and sizing of the electric motors 60, 80 and batteries 64, 84 may be varied for some embodiments. In some embodiments, four batteries on the left side for the left boom members 34, 52 are connected in parallel, effectively forming one big battery on the left side, to which all the vertical thrust units on the left side are connected, and likewise on the right side for the right boom members 42, 56.

In some embodiments, left rear internal structural members 120 within the left vertical stabilizer 40 extend between the rear wing 30 and the left rear landing gear 114. A rear wing 30 may be mechanically coupled to a rear portion 32 of a fuselage 22 and may be mechanically coupled to an upper portion of the fuselage 22, such that the rear wing 30 may be located above the fuselage 22. As shown in FIG. 4, internal structural beams 122 of the rear wing 30 may be mechanically coupled to the fuselage 22 by brackets 124, for example, using bolts, rivets, screws, or other fasteners or other fastening techniques such as spot welding, adhesives, or the like. In some embodiments, the internal structural beams 122 may be c-beams, but may also be solid members, hollow tubes, I-beams, flat spars, or the like. In some embodiments, the left vertical stabilizer 40 may be mechanically coupled to the rear wing 30 via the left rear internal structural members 120 attached to internal structural beams 122 of the rear wing 30, for example, by bolts, screws, rivets, welding adhesives, or the like. As shown in FIGS. 3-5, the left rear landing gear 114 may be mechanically coupled to the left rear internal structural members 120 of the left vertical stabilizer 40. The left rear internal structural members 120 may be made from aluminum, aluminum alloy, titanium, steel, steel alloy, carbon fiber, fiberglass, titanium-carbon-fiber composite, structural composite material, or any combination thereof, for example. The left rear internal structural members 120 may transfer and distribute forces, loads, and stresses among the left rear landing gear 114, the left boom member 34, the left vertical stabilizer 40, the rear wing 30, and the fuselage 22.

A left vertical stabilizer 40 and a left secondary boom member 52 may be mechanically coupled to the rear wing 30 at a spaced distance 48 from the fuselage 22. The structure and configuration shown in FIG. 4 allows the rear wing 30, such as the internal structural beams 122 of the rear wing 30, to act as a leaf spring biased between the fuselage 22 and the components mechanically coupled to and supported by the rear wing 30, such as the left secondary boom member 52, the left vertical stabilizer 40, and the left boom member 34.

The left rear landing gear 114 may include a left rear shock absorber 130 and a left rear landing pad 140. The left rear landing pad 140 may include a generally disc-shaped member 148. The left rear shock absorber 130 may be mechanically coupled to the left rear internal structural members 120. The left rear landing pad 140 may be mechanically coupled to the left rear shock absorber 130. In some embodiments, corresponding right rear landing gear 116 of an aircraft 20 may be identical or mirror symmetrical to the left rear landing gear 114 shown in FIG. 5.

During vertical takeoff and landing of an aircraft embodiment 20, a left rear ground load exerted on the left rear landing gear 114 may be transferred to the fuselage 22 via the left rear landing pad 140, via the left rear shock absorber 130, via the left rear internal structural members 120 of the left vertical stabilizer 40, and via the rear wing 30, while the flex of the internal structural beams 122 of the rear wing 30 acts as a leaf spring, and may be acting as a leaf spring suspension, and while the left rear shock absorber 130 acts as a dampener. In some embodiments, such suspension and dampening functionality may provide less vibrations, shocks, and impact forces applied to the fuselage 22 and cargo in the fuselage 22. And in some embodiments, the same may happen on a mirror-symmetric right side of an aircraft 20.

Referring to FIGS. 4 and 5, in some embodiments, during vertical landing of an aircraft embodiment 20, a cargo load in the fuselage 22 and the weight of the fuselage structure and components, such as forward propulsion system, as well as the inertia, stresses, potential energy, and kinetic energy thereof from the movement and propulsion(s) of the aircraft 20, may be distributed and transferred to the ground via the rear wing 30, while the flex of the internal structural beams 122 of the rear wing 30 act as leaf springs, and may be acting as a leaf spring suspension, via the left rear internal structural members 120 of the left vertical stabilizer 40, via the left rear shock absorber 130, such as acting as a vibration, impact, and movement dampener, and via the left rear landing pad 140, with the rear wing 30 and left rear shock absorber 130 acting as a suspension system to thereby provide less vibrations, shocks, and impact forces applied to the fuselage 22 and cargo in the fuselage 22. In some embodiments, for an aircraft 20 with a mirror-symmetric layout or configuration, the same may happen on the right side.

And in some embodiments, during vertical takeoff and landing of an aircraft 20, the lift forces, vibrations, inertia, and kinetic energy generated by the vertical propulsion systems of the left boom member 34, right boom member 42, left secondary boom member 52, and the right secondary boom member 56, may be dampened and attenuated by the leaf spring action of the rear wing 30, which may provide less vibrations, shocks, and impact forces applied to the fuselage 22 and cargo in the fuselage 22. For example, the embodiments of FIGS. 3-5 has an independent rear suspension system, while making use of multifunctional structures and components of the aircraft 20.

Figure 6:
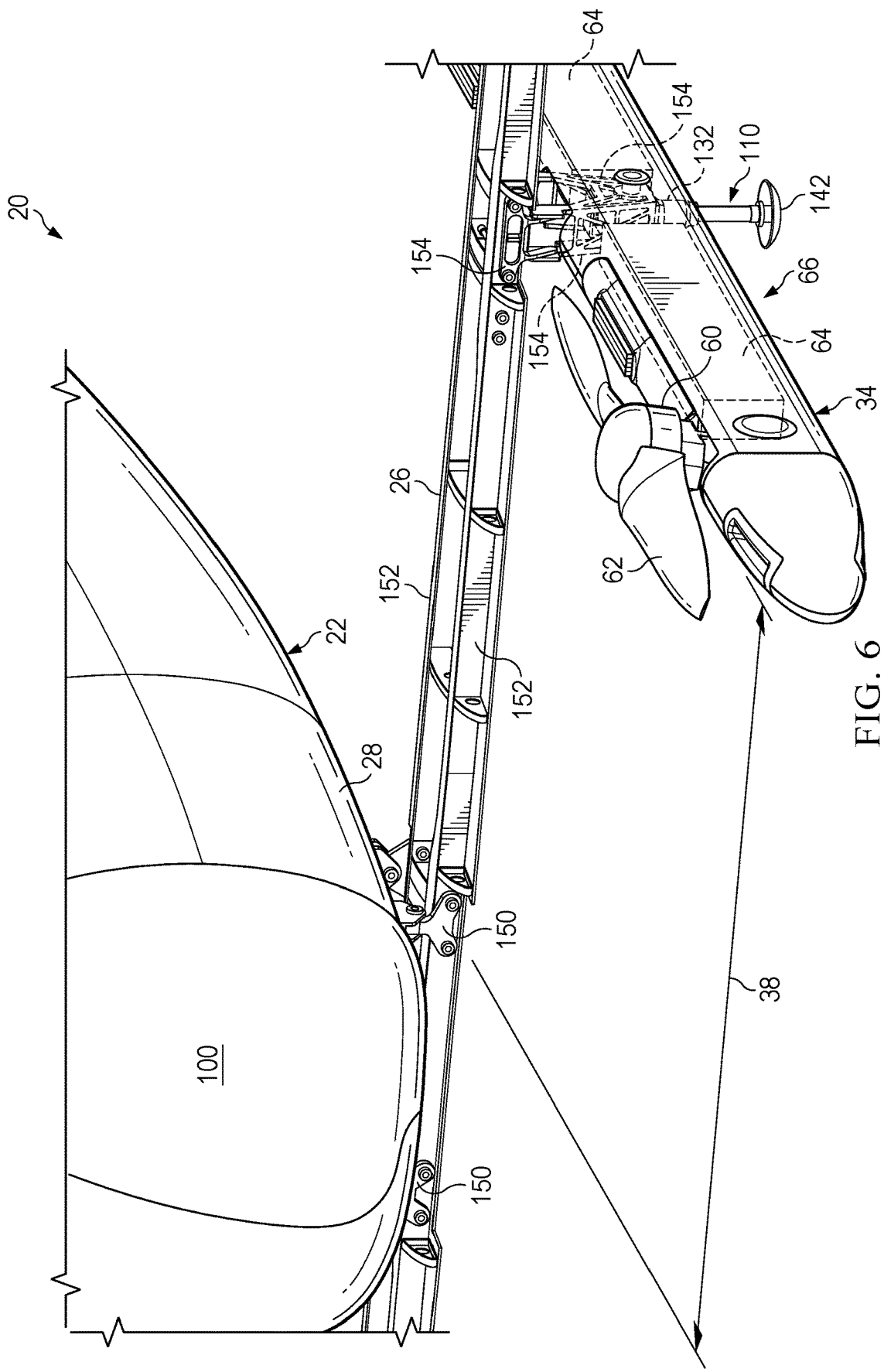
FIG. 6 is a front perspective and cutaway view of a portion of an aircraft according to some embodiments.
Figure 7:
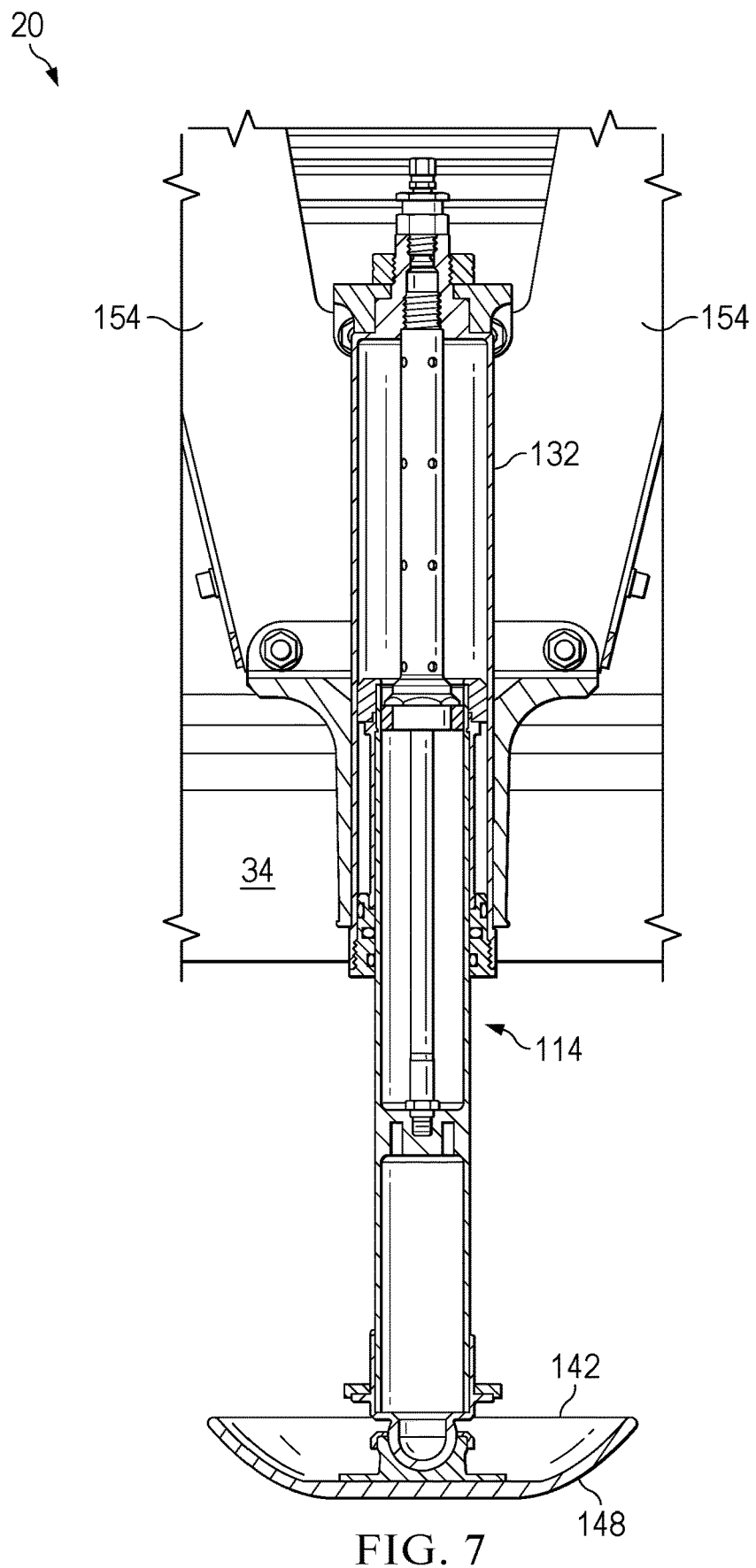
FIG. 7 is a side and cutaway view of a portion of an aircraft according to some embodiments.

In some embodiments, an aircraft 20 may have also an independent front suspension system, while making use of multifunctional structures and components of the aircraft 20. FIG. 6 is a front-perspective cutaway view of a left portion of an aircraft 20 according to some embodiments, illustrating a front portion 28 of a fuselage 22, a left portion of a front wing 26, a front portion of a left boom member 34, and a left front landing gear 110. FIG. 7 is a side cutaway view of a left portion of an aircraft 20 according to some embodiments, illustrating a left front landing gear 110. In some embodiments, corresponding right side structures and components of an aircraft 20 may be identical or mirror symmetrical to those left side structures and components shown in FIGS. 3, 6, and 7.

The front wing 26 may be mechanically coupled to a front portion 28 of the fuselage 22 and on a bottom side of the fuselage 22, via brackets 150 attached to internal structural beams 152 within the front wing 26, for example, by bolts, screws, rivets, welding, adhesives, or the like. In some embodiments, the front wing 26 may be located below the fuselage 22 or extend from a lower portion of the fuselage 22. As shown in FIG. 6, a left boom member 34 may be mechanically coupled to the front wing 26, via a left front internal structural member 154 of the left boom member 34 attached to internal structural beams 152 within the front wing 26, for example, by bolts, screws, rivets, welding, adhesives, or the like. And as shown in FIGS. 3 and 6, a left front landing gear 110 may be mechanically coupled to the front wing 26, via a left front internal structural member 154 of a left boom member 34 attached to internal structural beams 152 within the front wing 26, for example, by bolts, screws, rivets, welding, adhesives, or the like. In some embodiments, a portion of the left front internal structural member 154, or a bracket extending from the left front internal structural member 154, may extend above a top surface of the boom members 34. Alternatively, in some embodiments, a portion of the internal structural beam(s) 152 of the front wing 26, or a bracket extending from the internal structural beam(s) 152, may extend below a bottom surface of the front wing 26, and may extend into the boom member 34, for attachment to the left front internal structural member 154 of the boom member 34.

In some embodiments, as illustrated in FIG. 7, the left front landing gear 110 may include a left front shock absorber 132 and a left front landing pad 142. The left front landing pad 142 may include a generally disc-shaped member 148. The left front shock absorber 132 may be mechanically coupled to the left front internal structural member 154 of the left boom member 34, for example, by bolts, screws, rivets, welding, adhesives, or the like. The left front landing pad 142 may be mechanically coupled to the left front shock absorber 132, for example, by bolts, screws, rivets, welding, adhesives, or the like. In some embodiments, corresponding right front landing gear 112 of an aircraft 20 may be identical or mirror symmetrical to the left front landing gear 110 illustrated in FIG. 7.

In some embodiments, during vertical takeoff and landing of an aircraft 20, a left front ground load exerted on the left front landing gear 110 may be transferred to the fuselage 22 via the left front landing pad 142, via the left rear shock absorber 132, via the left front internal structural members 154 of the left boom member 34, and via the front wing 26, while the flex of the internal structural beams 152 of the front wing 26 act as a leaf spring, and may act as a leaf spring suspension, while the left front shock absorber 132 acts as a dampener, which may provide less vibrations, shocks, and impact forces applied to the fuselage 22 and cargo in the fuselage 22. And in some embodiments having an aircraft 20 with a mirror-symmetric layout or configuration, the same may happen on the right side.

In some embodiments, referring to FIGS. 3, 6, and 7 for example, during vertical landing of an aircraft 20, a cargo load in a fuselage 22 and the weight of the fuselage structure and components, such as a forward propulsion system, as well as the inertia, stresses, potential energy, and kinetic energy thereof from the movement and propulsion(s) of the aircraft 20, may be distributed and transferred to the ground via a front wing 26, while the flex of internal structural beams 152 of the front wing 26 act as leaf springs, and may act as a leaf spring suspension, via left front internal structural members 154 of a left boom member 34, via a left front shock absorber 132, may act as dampener of vibrations, impacts, and movements, and via a left front landing pad 142, with the front wing 26 and left front shock absorber 132 acting as a suspension system to thereby provide less vibrations, shocks, and impact forces applied to the fuselage 22 and cargo in the fuselage 22. In some embodiment having an aircraft embodiment 20 with a mirror-symmetric layout or configuration, the same may happen on the right side.

And in some embodiments, referring to FIGS. 3, 6, and 7 for example, during vertical takeoff and landing of an aircraft 20, the lift forces, vibrations, inertia, and kinetic energy generated by vertical propulsion systems of a left boom member 34, right boom member 42, left secondary boom member 52, and right secondary boom member 56, may be dampened and attenuated by the leaf spring action of a front wing 26, which provide less vibrations, shocks, and impact forces applied to a fuselage 22 and cargo in the fuselage 22. In some embodiments, such as the aircraft 20 illustrated in FIGS. 3, 6, and 7 for example, the aircraft 20 has an independent front suspension system, while making use of multifunctional structures and components of the aircraft 20. And with the front and rear independent suspension systems of such aircraft 20, the impact and ground forces may be absorbed and attenuated relative to a fuselage 22, and cargo therein, during landing, even when one or more of the landing gear 110, 112, 114, 116 engage the ground at different times and rates, such as forces due to uneven ground, due to a slope of the landing area, due to wind gusts, due to aerodynamic ground effects, or any combination thereof.

Figure 8:
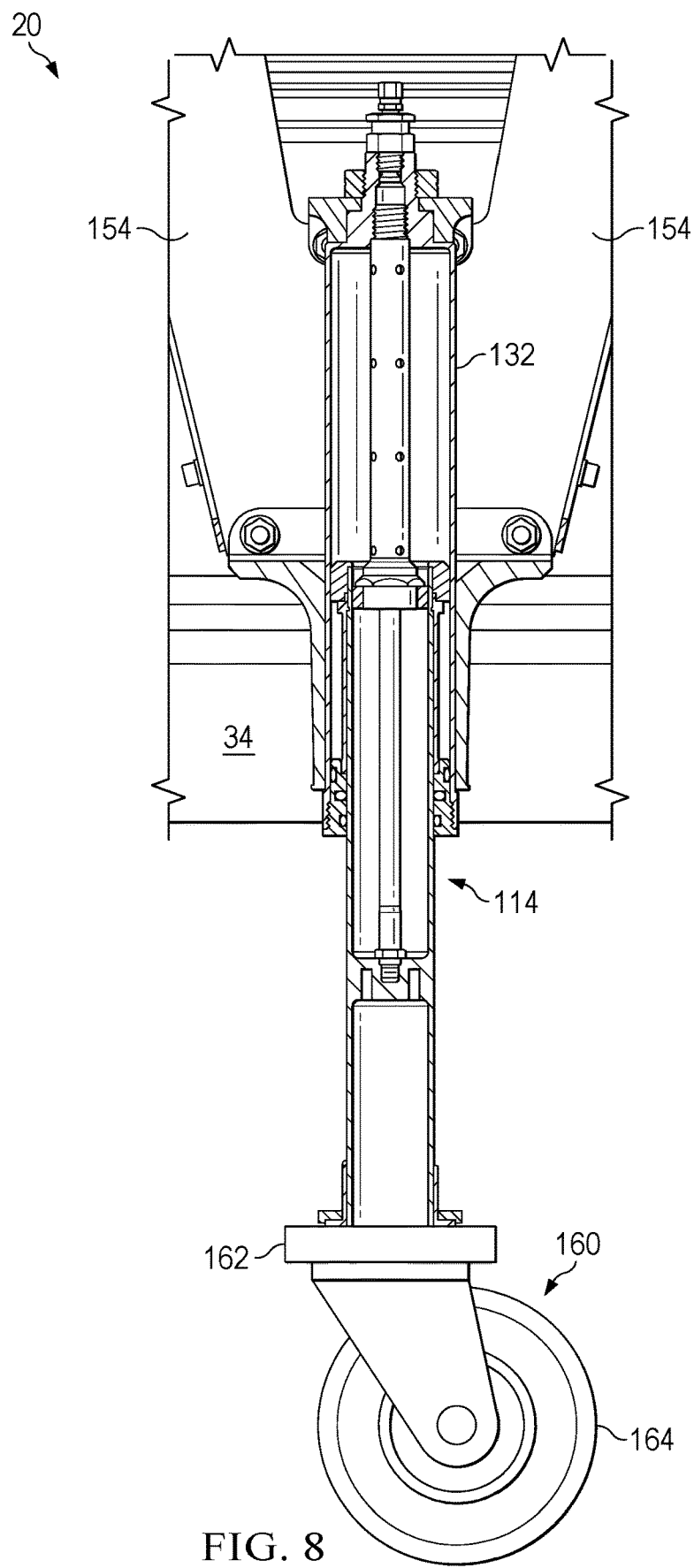
FIG. 8 is a side and cutaway view of a portion of an aircraft according to some embodiments.

FIG. 8 is a side cutaway view of a left portion of an aircraft 20 according to some embodiments, illustrating a left front landing gear 110. In some embodiments, a left front landing gear 110 may include a left front shock absorber 132 and a left front wheel 160. The left front shock absorber 132 may be mechanically coupled to a left front internal structural member 154 of a left boom member 34, for example, by bolts, screws, rivets, welding, adhesives, or the like. The left front wheel 160 may be mechanically coupled to the left front shock absorber 132, such as via a bearing 162 to allow the wheel 160 to pivot or rotate about a vertical axis. In some embodiments, corresponding right front landing gear 112 of an aircraft 20 may be identical or mirror symmetrical to the left front landing gear 110. Also, rear landing gear 114, 116 of some embodiments may include wheels like the wheel 160 shown in FIG. 8. In some embodiments, an advantage of having wheels 160 may be that an aircraft 20 may be moved and maneuvered more easily compared to landing pads 140, 142, 144, 146, which may be convenient for adjusting a position and location of a landed aircraft, and which may be useful for wheeling a landed aircraft into a hanger or shelter, such as during a storm or while being stored. Furthermore, for some embodiments of an aircraft 20 including wheels 160, the aircraft 20 may be wheeled into a warehouse for loading cargo into the fuselage 22, which may be advantageous for many situations, such as loading cold or temperature sensitive cargo where the outside environment is hot, loading temperature sensitive cargo where the outside environment is too cold, or preventing theft or damage to the aircraft or cargo when loading is protracted overnight. And, in some embodiments, tires 164, for example air or nitrogen filled tires, of wheels 160 for landing gear 110, 112, 114, 116 may further cushion and dampen the ground forces exerted on the aircraft 20 during landing, as another advantage.

The multifunction structure and components of an aircraft 20 of some embodiments, as illustrated in FIGS. 1-8 for example, may provide a method of distributing loads for the aircraft. For example, in some embodiments, loads may be distributed by supporting a fuselage 22 by a front wing 26 and a rear wing 30. For example, in some embodiments, during flight of the aircraft 20, loads may be distributed by supporting a left boom member 34 by a front wing 26 and a rear wing 30. For example, in some embodiments, loads may be distributed by supporting a left vertical propulsion system by a left boom member 34 and a left secondary boom member 52. Similarly, in some embodiments, during flight of the aircraft 20, loads may be distributed by supporting a right boom member 42 by a front wing 26 and a rear wing 30. For example, in some embodiments, loads may be distributed by supporting a right vertical propulsion system by a right boom member 42 and a right secondary boom member 56. For example, in some embodiments, loads may be distributed by supporting a forward propulsion system 96 by a fuselage 22. For example, in some embodiments, while the aircraft 20 is landed, loads may be distributed by supporting a rear wing 30 and by a left rear landing gear 114 via a left rear internal structural member 120 of a left vertical stabilizer 40, and supporting the rear wing 30 by a right rear landing gear 116 via a right rear internal structural member of a right vertical stabilizer 50. For example, in some embodiments, while the aircraft 20 is landed, loads may be distributed by supporting a front wing 26 by a left front landing gear 110 via a left front internal structural member 154 of a left boom member 34, and supporting the front wing 26 by a right front landing gear 112 via a right front internal structural member of a right boom member 42. For example, in some embodiments, while the aircraft 20 is landed, loads may be distributed by supporting a left boom member 34 by a left front landing gear 110 and a left rear landing gear 114. For example, in some embodiments, while the aircraft 20 is landed, loads may be distributed by supporting a right boom member 42 by a right front landing gear 112 and a right rear landing gear 116.

For example, in some embodiments, loads may be distributed by biasing a left front leaf spring between a fuselage 22 and a left boom member 34, using a left portion of the front wing 26 as the left front leaf spring, biasing a right front leaf spring between the fuselage 22 and a right boom member 42, using a right portion of the front wing 26 as the right front leaf spring, biasing a left rear leaf spring between the fuselage 22 and the left boom member 34, using a left portion of the rear wing 30 as the left rear leaf spring, and biasing a right rear leaf spring between the fuselage 22 and the right boom member 42, using a right portion of the rear wing 30 as the right rear leaf spring. For example, in some embodiments, loads may be distributed by dampening a left front ground force during landing of the aircraft 20 using a left front landing gear 110 because the left front landing gear 110 includes a left front shock absorber 132, dampening a right front ground force during landing of the aircraft 20 using a right front landing gear 112 because the right front landing gear 112 includes a right front shock absorber, dampening a left rear ground force during landing of the aircraft 20 using a left rear landing gear 114 because the left rear landing gear 114 includes a left rear shock absorber 130, and dampening a right rear ground force during landing of the aircraft 20 using a right rear landing gear 116 because the right rear landing gear 116 includes a right rear shock absorber.

In some embodiments, an aircraft 20 may have a front wing bisecting a fuselage 22, at lower, central, or upper region of the fuselage 22. In some embodiments, an aircraft 20 may have a front wing located above a fuselage 22. Similarly, in some embodiments, an aircraft may have a rear wing bisecting a fuselage 22, at lower, central, or upper region of the fuselage 22. And in some embodiments, an aircraft 20 may have a rear wing located below a fuselage 22. In some embodiments, an aircraft 20 may have boom members located above a front wing and above a rear wing.

In some embodiments, for an aircraft 20 with a front wing at a lower region of a fuselage 22 or below the fuselage 22, and with a rear wing at an upper region of the fuselage 22 or above the fuselage 22, the aircraft may have boom members located above the front wing and below the rear wing, and secondary boom members may be absent as separate components, for example as longer boom members, or secondary boom members may be separate components at different levels than the main boom members.

In some embodiments, for an aircraft 20 with a front wing at a central or an upper region of a fuselage 22 or above the fuselage 22, and with a rear wing at a central or a lower region of the fuselage 22 or below the fuselage 22, the aircraft may have boom members located below the front wing and above the rear wing, for example, with a vertical stabilizer still extending between the boom member and the rear wing, and secondary boom members may be absent as separate components, for example, having longer boom members, or secondary boom members may be separate components at different levels than the main boom members.

Various structures and components of an aircraft 20 of some embodiments may be multifunctional structures. As advantages, such multifunctional structures may greatly optimize the weight of the aircraft 20, for example, reducing fuel consumption, extending flight range, improving aerodynamic efficiency, reducing drag, reducing fuel consumption, extending flight range, reducing the product cost by having less components to produce, or reducing maintenance cost and intervals because fewer parts need to be replaced.

For example, in some embodiments, the left rear internal structural members 120, as illustrated in FIGS. 3-5 for example, are multifunctional in providing support, weight transfer, and load distribution for the left secondary boom member 52, the left vertical stabilizer 40, the left rear landing gear 114, and the left boom member 34, as well as the rear wing 30 and the fuselage 22. For example, in some embodiments, the rear wing 30, as illustrated in FIG. 4 for example, is multifunctional in providing support, weight transfer, and load distribution, and even acting as a leaf spring, for and between the fuselage 22, the left secondary boom member 52, the left vertical stabilizer 40, the left rear landing gear 114, and the left boom member 34, while also acting as an airfoil to generate lift during flight. For example, in some embodiments, the front wing 26, as illustrated in FIG. 6 for example, is multifunctional in providing support, weight transfer, and load distribution, and even acting as a leaf spring, for and between the fuselage 22, the left boom member 34, and the left front landing gear 110, while also acting as an airfoil to generate lift during flight.

For example, in some embodiments, the left and right boom members 34, 42, as illustrated in FIGS. 1-3 for example, are multifunctional structures by housing and supporting vertical propulsion systems, while also optimizing storage space inside the fuselage 22, while also improving air flow characteristics for the rear wing 30, while also providing a stable weight distribution of the aircraft 20 while loading and unloading cargo to and from the fuselage 22, for example, providing a lower center of gravity and having weight distributed wider while the aircraft 20 is landed and during loading and unloading, while also providing enhanced access to the cargo area 104 for a fork lift 106, for example, due to a wide stance by the spaced distances 38, 48 separating the fuselage 22 from the left and right boom members 34, 42.

In some embodiments, one of the functions of the left and right boom members 34, 42 is to protect the propulsion, cooling, electronic, charging, signal, monitoring cables, and other critical components from high energy fragments and/or foreign object damage in general. In some embodiments, the rib members of the boom members 34, 42 are designed such that the casing of the battery is not in contact with the outer boom skin, which provides a layer of air insulating the outer wall of the battery casing from the boom skin. It is envisioned to fly for extended periods of time, such as beyond a nominal 300 km or 1.5 hours of flight time, when new regulations allow for longer flights. When flying at high altitudes and cold air temp, if not designed properly, the cold outside air, through the boom skin, might quickly cool down the battery too much, rendering the battery inoperative, or alternatively the battery might need to be discharged internally in order keep itself from cooling down too much. Hence in some embodiments, having a layer of air insulating the outer wall of the battery casing from the boom skin may provide advantages in adapting to differing flight conditions.

Some embodiments are an unmanned cargo aircraft 20, which have vertical takeoff and landing (VTOL) capabilities. High energy fragment protection with primary structure is an explicit requirement for certification of VTOL vehicles in Europe, and thus such protection functionality is another advantage of the multifunction structure and design of some embodiments.

Figure 9:
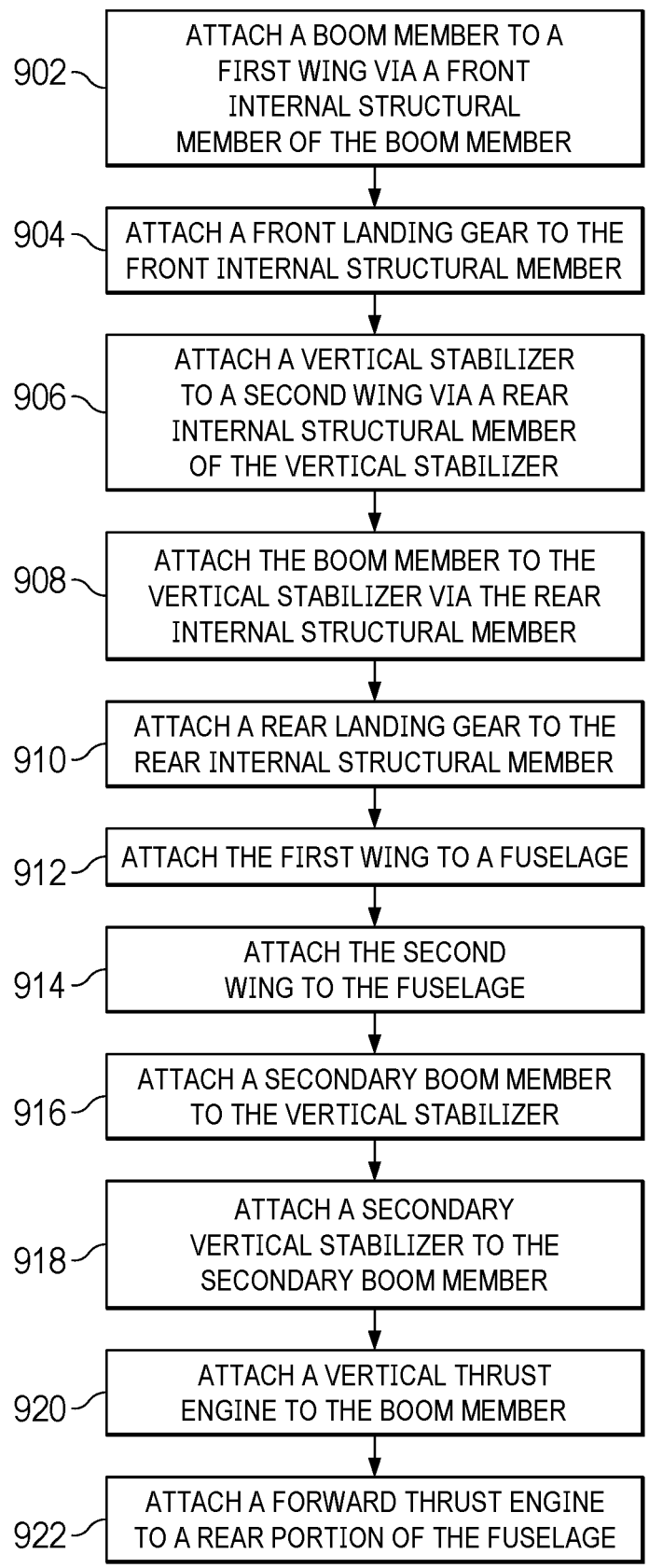
FIG. 9 is a flowchart of a method of producing an aircraft according to some embodiments.

FIG. 9 is a flowchart of a method of producing an aircraft according to some embodiments. At operation 902, a boom member may be attached to a first wing via a front internal structural member of the boom member. In some embodiments, as illustrated in FIG. 6 for example, a portion of the front internal structural member 154 that is or will extend above a top surface of the boom member 34 is attached to an internal structural beam or beams 152 of the front wing 26, for example, by bolts, screws, rivets, welding, adhesives, or the like.

At operation 904, a front landing gear may be attached to the front internal structural member. In some embodiments, as illustrated in FIGS. 3 and 6 for example, a front shock absorber 132 of the front landing gear 110 is attached to the front internal structural member 154, for example, by bolts, screws, rivets, welding, adhesives, or the like, and a landing pad 142 of the front landing gear 110 is attached to the front shock absorber 132, for example, by bolts, screws, rivets, welding, adhesives, or the like.

At operation 906, a vertical stabilizer may be attached to a second wing via a rear internal structural member of the vertical stabilizer. In some embodiments, as illustrated in FIGS. 3-5, for example, a portion of a rear internal structural member 120 extending above the vertical stabilizer 40 is attached to internal structural beam(s) 122 of the rear wing 30, for example, by bolts, screws, rivets, welding, adhesives, or the like.

At operation 908, the boom member may be attached to the vertical stabilizer via the rear internal structural member, such that the boom member is also coupled to the second wing via the rear internal structural member. In some embodiments, as illustrated in FIGS. 3-5 for example, portions of the rear internal structural member 120 extend into the boom member 34 and the boom member 34 is attached to the rear internal structural member 120, for example, by bolts, screws, rivets, welding, adhesives, or the like.

At operation 910, a rear landing gear may be attached to the rear internal structural member. In some embodiments, as illustrated in FIGS. 3-5 for example, portions of the rear internal structural member 120 that extend into the boom member 34 are attached to the rear shock absorber 130 of the rear landing gear 114, and the rear landing pad 140 or a wheel 160 is attached to the rear shock absorber 130, for example, by bolts, screws, rivets, welding, adhesives, or the like.

At operation 912, a first wing may be attached to a fuselage, such that the boom member is separated from the fuselage by a first spaced distance. In some embodiments, as illustrated in FIG. 6 for example, brackets 150 are attached to the fuselage 22 and to the internal structural beams 152 of the front wing 26, for example, by bolts, screws, rivets, welding, adhesives, or the like. And in some embodiments, as illustrated in FIG. 6 for example, the boom member 34 is separated from the fuselage 22 by a spaced distance 38.

At operation 914, a second wing may be attached to a fuselage, such that the vertical stabilizer is separated from the fuselage by a second spaced distance. In some embodiments, as illustrated in FIG. 4 for example, brackets 124 are attached to the fuselage 22 and to the internal structural beams 122 of the rear wing 30, for example, by bolts, screws, rivets, welding, adhesives, or the like.

At operation 916, a secondary boom member may be attached to the vertical stabilizer, such that the secondary boom member is offset relative to the boom member and such that the vertical stabilizer is located between the boom member and the secondary boom member. In some embodiments, as illustrated in FIGS. 3 and 4 for example, the secondary boom member 52 is attached to internal structural members 120 of the vertical stabilizer 40, for example, by bolts, screws, rivets, welding, adhesives, or the like. And in some embodiments, as illustrated in FIGS. 3 and 4 for example, the secondary boom member 52 is offset relative to the boom member 34 while the vertical stabilizer 40 is located between the secondary boom member 52 and the boom member 34.

At operation 918, a secondary vertical stabilizer may be attached to the secondary boom member, such that the secondary vertical stabilizer is separated from the vertical stabilizer by a third spaced distance. In some embodiments, as illustrated in FIG. 3 for example, the secondary vertical stabilizer 54 is attached to the secondary boom member 52, for example, by bolts, screws, rivets, welding, adhesives, or the like.

At operation 920, a vertical thrust engine is attached to the boom member. In some embodiments, as illustrated in FIG. 3 for example, electric motors 60 are attached to the boom member 34 via engine brackets or mechanical couplings, for example, by bolts, screws, rivets, welding, adhesives, or the like.

At operation 922, a forward thrust engine is attached to a rear portion of the fuselage. In some embodiments, as illustrated in FIGS. 1 and 2 for example, an engine 90 is attached to and at least partially within the fuselage 220 at the rearward portion 32 of the fuselage 22, for example, by bolts, screws, rivets, welding, adhesives, or the like.

In some embodiments, the order of doing operations 902 to 922 may be varied, as should be apparent to one of ordinary skill in the art. In some embodiments, some of the operations 902 to 922 may be combined or split into suboperations, as should be apparent to one of ordinary skill in the art. And in some embodiments, some of the operations 902 to 922 may be omitted or some operations may be added and inserted, as should be apparent to one of ordinary skill in the art.

An embodiment aircraft boom includes a boom member, a vertical stabilizer, a rear landing gear, and a front landing gear. In the embodiment, the boom member extends in a first direction and has a front internal structural member disposed therein, where a portion of the front internal structural member is a first attachment point for a first wing. In the embodiment, the vertical stabilizer extends from the boom member, where the vertical stabilizer has a rear internal structural member disposed therein and extends from the boom member and through an interior of the vertical stabilizer, and where a portion of the rear internal structural member is a second attachment point for a second wing. In the embodiment, the rear landing gear is coupled to the rear internal structural member, where the rear landing gear extends through a bottom rear portion of the boom member. And in the embodiment, the front landing gear is coupled to the front internal structural member of the boom member, where the front landing gear extends through a bottom front portion of the boom member.

In some embodiments, the aircraft boom further includes a secondary boom member offset from the boom member in a second direction and extending in the first direction, where the rear internal structural member extends from the secondary boom member, through the interior of the vertical stabilizer, and into the boom member, and where a first end of the vertical stabilizer is adjacent the secondary boom member. In some embodiments, the aircraft boom further includes a secondary vertical stabilizer extending from the secondary boom member, where the secondary vertical stabilizer is separated in the first direction from the vertical stabilizer by a spaced distance. In some embodiments, the secondary vertical stabilizer is disposed at a side of the secondary boom member that substantially faces away from the boom member, where the vertical stabilizer is disposed nearest a first end of the secondary boom member, and where the secondary vertical stabilizer is disposed nearest a second end of the secondary boom member. In some embodiments, the aircraft boom further includes a first vertical thrust engine mechanically coupled to the boom member, and a first vertical thrust propeller mechanically coupled to the first vertical thrust engine. In some embodiments, the aircraft boom further includes a second vertical thrust engine mechanically coupled to the secondary boom member, and a second vertical thrust propeller mechanically coupled to the second vertical thrust engine. In some embodiments, the first vertical thrust propeller is offset, in the second direction, from the second vertical thrust propeller.

In some embodiments, the first attachment point is configured to mechanically couple a top side the boom member that faces the secondary boom member to a bottom side of the first wing such that the boom member is located below the first wing. In some embodiments, the second attachment point is configured to mechanically couple the first end of the vertical stabilizer to the second wing such that the vertical stabilizer is located below the second wing and such that the boom member is separated from the second wing by a spaced distance. In some embodiments, the boom member is configured to transfer a front ground load from the front landing gear, through the front internal structural member, to the first attachment point. In some embodiments, the boom member is configured to transfer a rear ground load from the rear landing gear, through the rear internal structural member, to the second attachment point.

In some embodiments, the rear internal structural member includes a first rear structural member portion extending from a first side of the rear landing gear, through the vertical stabilizer, past the first end of the vertical stabilizer, and forming a first portion of the second attachment point. In some embodiments, the rear internal structural member further includes a second rear structural member portion extending from a second side of the rear landing gear, through the vertical stabilizer, past the first end of the vertical stabilizer, and forming a second portion of the second attachment point.

In some embodiments, the rear landing gear includes a rear shock absorber, and where the front landing gear includes a front shock absorber. In some embodiments, the rear landing gear further includes a rear landing pad, where the rear landing pad is mechanically coupled to the rear shock absorber. In some embodiments, the front landing gear further includes a front landing pad, where the front landing pad is mechanically coupled to the front shock absorber.

In some embodiments, the rear landing gear further includes a rear wheel, where the rear wheel is mechanically coupled to the rear shock absorber. In some embodiments, the front landing gear further includes a front wheel, where the front wheel is mechanically coupled to the front shock absorber.

An embodiment aircraft includes a fuselage, a first wing coupled to the fuselage, a second wing coupled to the fuselage, a boom member located outside of the fuselage and separated from the fuselage by a first spaced distance, a vertical stabilizer extending between the boom member and the second wing, where the boom member is coupled to the second wing via the vertical stabilizer, a rear landing gear coupled to a rear internal structural member of the vertical stabilizer, where the rear internal structural member is coupled to the second wing, and a front landing gear coupled to a front internal structural member of the boom member, where the front internal structural member is coupled to the first wing.

In some embodiments, the fuselage extends along a central longitudinal axis of the aircraft, the first wing is located below the fuselage, the first wing is coupled to a forward portion of the fuselage, the second wing is located above the fuselage, the second wing is coupled to a rearward portion of the fuselage, the boom member is located below the first wing, the vertical stabilizer is located below the second wing, and the boom member is located below the vertical stabilizer. In some embodiments, a first portion of the first wing extending between the front internal structural member and the fuselage is configured to be a first leaf spring between the fuselage and the boom member. In some embodiments, a second portion of the second wing extending between the rear internal structural member and the fuselage is configured to be a second leaf spring between the fuselage and the boom member.

An embodiment method of producing an aircraft includes attaching a boom member to a first wing via a front internal structural member of the boom member, attaching a front landing gear to the front internal structural member, attaching a vertical stabilizer to a second wing via a rear internal structural member of the vertical stabilizer, where the boom member is coupled to the second wing via the rear internal structural member, attaching a rear landing gear to the rear internal structural member, attaching the first wing to a fuselage, where the boom member is separated from the fuselage by a first spaced distance, and attaching the second wing to the fuselage, where the vertical stabilizer is separated from the fuselage by a second spaced distance.

In some embodiments, a method of producing an aircraft further includes forming a secondary boom member extending from the vertical stabilizer, where the secondary boom member is offset relative to the boom member such that the vertical stabilizer is located between the boom member and the secondary boom member, and attaching a secondary vertical stabilizer to the secondary boom member, where the secondary vertical stabilizer is separated from the vertical stabilizer by a third spaced distance.

While illustrative embodiments have been described with reference to illustrative drawings, this description is not intended to be construed in a limiting sense. Various modifications and combinations of the illustrative embodiments, as well as other embodiments, may be apparent to persons skilled in the pertinent art upon referencing the present disclosure. It is therefore intended that the appended claims encompass any and all of such modifications or embodiments.

What is claimed is:

1. An aircraft boom, comprising: a boom member extending in a first direction and having a front internal structural member disposed therein, wherein a portion of the front internal structural member is a first attachment point for a first wing; a vertical stabilizer extending from the boom member, the vertical stabilizer having a rear internal structural member disposed therein and extending from the boom member and through an interior of the vertical stabilizer, wherein a portion of the rear internal structural member is a second attachment point for a second wing; a rear landing gear coupled to the rear internal structural member, and the rear landing gear extending through a bottom rear portion of the boom member; and a front landing gear coupled to the front internal structural member of the boom member, and the front landing gear extending through a bottom front portion of the boom member; further comprising a secondary boom member offset from the boom member in a second direction and extending in the first direction, wherein the rear internal structural member extends from the secondary boom member, through the interior of the vertical stabilizer, and into the boom member, wherein a first end of the vertical stabilizer is adjacent the secondary boom member.

2. The aircraft boom of claim 1, further comprising: a first vertical thrust engine mechanically coupled to the boom member; and a first vertical thrust propeller mechanically coupled to the first vertical thrust engine.

3. The aircraft boom of claim 2, further comprising:
a second vertical thrust engine mechanically coupled to the secondary boom member; and
a second vertical thrust propeller mechanically coupled to the second vertical thrust engine.

4. The aircraft boom of claim 3, wherein the first vertical thrust propeller is offset, in the second direction, from the second vertical thrust propeller.

5. The aircraft boom of claim 1, further comprising a secondary vertical stabilizer extending from the secondary boom member, wherein the secondary vertical stabilizer is separated in the first direction from the vertical stabilizer by a spaced distance.

6. The aircraft boom of claim 5, wherein the secondary vertical stabilizer is disposed at a side of the secondary boom member that substantially faces away from the boom member, wherein the vertical stabilizer is disposed nearest a first end of the secondary boom member, and wherein the secondary vertical stabilizer is disposed nearest a second end of the secondary boom member.

7. The aircraft boom of claim 1, wherein the boom member is configured to transfer a rear ground load from the rear landing gear, through the rear internal structural member, to the second attachment point.

8. The aircraft boom of claim 7, wherein the rear internal structural member comprises a first rear structural member portion extending from a first side of the rear landing gear, through the vertical stabilizer, past the first end of the vertical stabilizer, and forming a first portion of the second attachment point, and wherein the rear internal structural member further comprises a second rear structural member portion extending from a second side of the rear landing gear, through the vertical stabilizer, past the first end of the vertical stabilizer, and forming a second portion of the second attachment point.

9. The aircraft boom of claim 1, wherein the rear landing gear comprises a rear shock absorber, and wherein the front landing gear comprises a front shock absorber.

10. The aircraft boom of claim 9, wherein the rear landing gear further comprises a rear landing pad, the rear landing pad being mechanically coupled to the rear shock absorber; and
wherein the front landing gear further comprises a front landing pad, the front landing pad being mechanically coupled to the front shock absorber.

11. The aircraft boom of claim 9, wherein the rear landing gear further comprises a rear wheel, the rear wheel being mechanically coupled to the rear shock absorber, and
wherein the front landing gear further comprises a front wheel, the front wheel being mechanically coupled to the front shock absorber.

12. The aircraft boom of claim 1, wherein the first attachment point is configured to mechanically couple a top side the boom member that faces the secondary boom member to a bottom side of the first wing such that the boom member is located below the first wing.

13. The aircraft boom of claim 1, wherein the second attachment point is configured to mechanically couple the first end of the vertical stabilizer to the second wing such that the vertical stabilizer is located below the second wing and such that the boom member is separated from the second wing by a spaced distance.

14. The aircraft boom of claim 1, wherein the boom member is configured to transfer a front ground load from the front landing gear, through the front internal structural member, to the first attachment point.

15. An aircraft comprising: a fuselage; a first wing coupled to the fuselage; a second wing coupled to the fuselage; a boom member located outside of the fuselage and separated from the fuselage by a first spaced distance; a vertical stabilizer extending between the boom member and the second wing, wherein the boom member is coupled to the second wing via the vertical stabilizer; a rear landing gear coupled to a rear internal structural member of the vertical stabilizer, and the rear internal structural member being coupled to the second wing; and a front landing gear coupled to a front internal structural member of the boom member, and the front internal structural member being coupled to the first wing; wherein the fuselage extends along a central longitudinal axis of the aircraft, wherein the first wing is located below the fuselage, wherein the first wing is coupled to a forward portion of the fuselage, wherein the second wing is located above the fuselage, wherein the second wing is coupled to a rearward portion of the fuselage, wherein the boom member is located below the first wing, wherein the vertical stabilizer is located below the second wing, and wherein the boom member is located below the vertical stabilizer.

16. The aircraft of claim 15, wherein a first portion of the first wing extending between the front internal structural member and the fuselage is configured to be a first leaf spring between the fuselage and the boom member, and wherein a second portion of the second wing extending between the rear internal structural member and the fuselage is configured to be a second leaf spring between the fuselage and the boom member.

17. A method of producing an aircraft, the method comprising: attaching a boom member to a first wing via a front internal structural member of the boom member; attaching a front landing gear to the front internal structural member; attaching a vertical stabilizer to a second wing via a rear internal structural member of the vertical stabilizer, wherein the boom member is coupled to the second wing via the rear internal structural member, attaching a rear landing gear to the rear internal structural member; attaching the first wing to a fuselage, wherein the boom member is separated from the fuselage by a first spaced distance; and attaching the second wing to the fuselage, wherein the vertical stabilizer is separated from the fuselage by a second spaced distance; the method further comprising: forming a secondary boom member extending from the vertical stabilizer, wherein the secondary boom member is offset relative to the boom member such that the vertical stabilizer is located between the boom member and the secondary boom member; and attaching a secondary vertical stabilizer to the secondary boom member, wherein the secondary vertical stabilizer is separated from the vertical stabilizer by a third spaced distance.

* * * * *